(12) United States Patent
Wang et al.

(10) Patent No.: US 10,574,775 B2
(45) Date of Patent: Feb. 25, 2020

(54) SYSTEMS AND METHODS TO OPTIMIZE NEWS FEED ACCESS

(71) Applicant: Facebook, Inc., Menlo Park, CA (US)

(72) Inventors: Meihong Wang, Sunnyvale, CA (US); Wenyuan Yu, Fremont, CA (US); Saurabh Aggarwal, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 157 days.

(21) Appl. No.: 14/965,709

(22) Filed: Dec. 10, 2015

(65) Prior Publication Data

US 2017/0171342 A1 Jun. 15, 2017

(51) Int. Cl.
| | | |
|---|---|---|
| H04L 29/08 | (2006.01) | |
| G06F 16/957 | (2019.01) | |
| H04L 12/26 | (2006.01) | |
| G06Q 50/00 | (2012.01) | |
| H04L 12/58 | (2006.01) | |

(52) U.S. Cl.
CPC ...... *H04L 67/2842* (2013.01); *G06F 16/9574* (2019.01); *H04L 67/06* (2013.01); *H04L 67/26* (2013.01); *H04L 67/2857* (2013.01); *H04L 67/306* (2013.01); *H04L 67/322* (2013.01); *G06Q 50/01* (2013.01); *H04L 43/0811* (2013.01); *H04L 43/0894* (2013.01); *H04L 43/16* (2013.01); *H04L 51/32* (2013.01); *H04L 67/02* (2013.01)

(58) Field of Classification Search
CPC ......... G06F 17/30861; G06F 17/30867; G06F 17/30902; G06F 16/24578; G06F 16/9535; G06F 16/9574; G06Q 50/01; H04L 51/32; H04L 67/02; H04L 67/2842; H04L 67/2847; H04L 67/289
See application file for complete search history.

(56) References Cited

U.S. PATENT DOCUMENTS

| | | | |
|---|---|---|---|
| 8,938,488 B1 * | 1/2015 | Sayed | H04L 67/2847 705/14.54 |
| 9,621,678 B1 * | 4/2017 | Guastaferro | H04L 67/02 |
| 9,715,482 B1 * | 7/2017 | Bjorkegren | G06F 17/24 |
| 2005/0216837 A1 * | 9/2005 | Washburn | G06F 17/30873 715/708 |
| 2007/0083468 A1 * | 4/2007 | Wetherell | G06F 17/3089 705/51 |
| 2009/0204481 A1 * | 8/2009 | Navar | G06Q 30/02 725/14 |
| 2009/0293013 A1 * | 11/2009 | O'Shaugnessy | G06F 3/0485 715/810 |
| 2010/0037251 A1 * | 2/2010 | Lindhult | H04H 60/16 725/31 |

(Continued)

*Primary Examiner* — Vivek Srivastava
*Assistant Examiner* — William C McBeth
(74) *Attorney, Agent, or Firm* — Sheppard Mullin Richter & Hampton LLP

(57) ABSTRACT

Systems, methods, and non-transitory computer readable media are configured to detect a communication link quality that fails to satisfy a communications bandwidth threshold. A cache associated with a client computing device of a user is queried for content items not consumed by the user for presentation in a news feed displayed on the client computing device. At least one content item of the content items not consumed by the user is presented in the news feed.

20 Claims, 7 Drawing Sheets

(56) References Cited

U.S. PATENT DOCUMENTS

| | | | |
|---|---|---|---|
| 2010/0262922 A1* | 10/2010 | Fan | G06Q 10/107 715/752 |
| 2010/0318640 A1* | 12/2010 | Mehta | H04L 67/2842 709/223 |
| 2012/0042012 A1* | 2/2012 | Darnell | H04L 67/1095 709/203 |
| 2012/0042267 A1* | 2/2012 | Cairns | G06Q 10/107 715/760 |
| 2013/0246521 A1* | 9/2013 | Schacht | G06Q 50/01 709/204 |
| 2014/0096062 A1* | 4/2014 | Luu | G06Q 50/01 715/774 |
| 2014/0164938 A1* | 6/2014 | Petterson | G06F 3/0482 715/739 |
| 2014/0189056 A1* | 7/2014 | St. Clair | H04L 67/303 709/217 |
| 2014/0317184 A1* | 10/2014 | Weaver | G06Q 50/01 709/204 |
| 2014/0324984 A1* | 10/2014 | Chang | H04L 51/32 709/206 |
| 2015/0033156 A1* | 1/2015 | Marchant | G06F 3/14 715/760 |
| 2015/0039601 A1* | 2/2015 | Harrang | G06F 17/30867 707/727 |
| 2015/0081449 A1* | 3/2015 | Ge | G06F 17/30867 705/14.66 |
| 2015/0200988 A1* | 7/2015 | Cabanillas | G06F 17/30902 709/203 |
| 2015/0286383 A1* | 10/2015 | D'Aloisio | G06F 3/04847 715/748 |
| 2016/0021211 A1* | 1/2016 | Yellin | H04L 67/2847 709/203 |
| 2016/0021213 A1* | 1/2016 | Ruan | G06Q 50/01 709/204 |
| 2016/0191650 A1* | 6/2016 | Rong | H04L 67/2847 709/213 |
| 2016/0234290 A1* | 8/2016 | Sharma | H04L 43/0894 |
| 2016/0267086 A1* | 9/2016 | Liden | G06F 16/24578 |
| 2016/0286002 A1* | 9/2016 | Marra | H04L 51/32 |
| 2016/0373396 A1* | 12/2016 | Sorg | H04L 51/32 |
| 2017/0005963 A1* | 1/2017 | Bastide | H04L 51/32 |
| 2017/0187822 A1* | 6/2017 | Thomee | H04L 67/2847 |
| 2017/0373997 A1* | 12/2017 | Deng | H04L 51/12 |

* cited by examiner

SYSTEMS AND METHODS TO OPTIMIZE NEWS FEED ACCESS

FIELD OF THE INVENTION

The present technology relates to the field of content provision. More particularly, the present technology relates to techniques for optimizing access to content items in a news feed.

BACKGROUND

Today, people often utilize computing devices for a wide variety of purposes. Users can use their computing devices, for example, to communicate and otherwise interact with other users. Such interactions are increasingly popular over a social network.

Some interactions in a social network may include the sharing of content. Content can be shared in a variety of manners. One example of a technique to share content with a user in a social network is a news feed. The news feed can be a listing of content items (or stories) that are deemed appropriate for presentation to the user. The news feed for the user can include myriad types of content items. Such content items can include, for example, images uploaded by others in the social network of the user, descriptions of activities of connections of the user, articles regarding subject matter of interest to the user, advertisements directed to the user, etc.

A news feed can be managed by a server system associated with a social network. A client computing device in communication with the server system can download content items to be presented in the news feed. User experience in accessing and consuming content items in the news feed can depend on the communications link quality between the client computing device and the server system. When the communications link quality is poor, user experience can be burdened by latency.

SUMMARY

Various embodiments of the present technology can include systems, methods, and non-transitory computer readable media configured to detect a communication link quality that fails to satisfy a communications bandwidth threshold. A cache associated with a client computing device of a user is queried for content items not consumed by the user for presentation in a news feed displayed on the client computing device. At least one content item of the content items not consumed by the user is presented in the news feed.

In an embodiment, a server system is queried for content items in response to a request for content items to be presented in the news feed. Content items from the server system are received in response to the querying when the communications link quality satisfies the communications bandwidth threshold.

In an embodiment, the request is a pull to refresh action performed by the user.

In an embodiment, it is determined whether the user consumed the content items based on a consumption threshold.

In an embodiment, the consumption threshold is associated with at least one of a time of consumption of a content item or a selected interaction with a content item.

In an embodiment, content items not consumed by the user are stored in a cache of the client computing device.

In an embodiment, the querying the cache comprises querying the cache for content items in response to a request for content items to be presented in the news feed when the communications link quality fails to satisfy the communications bandwidth threshold.

In an embodiment, the server system is not queried when the communications link quality fails to satisfy the communications bandwidth threshold.

In an embodiment, the content items not consumed by the user are sorted. The content items not consumed by the user are ranked.

In an embodiment, the client computing device includes the computing system.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
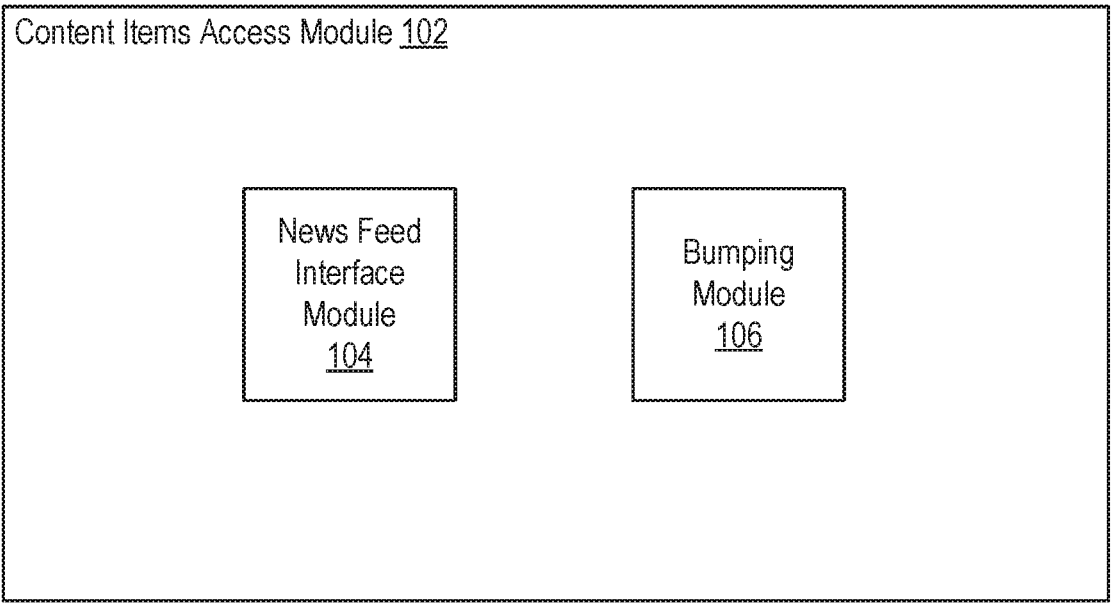
FIG. 1 illustrates a system including an example content items access module, according to an embodiment of the present technology.
Figure 1:
Figure 1:
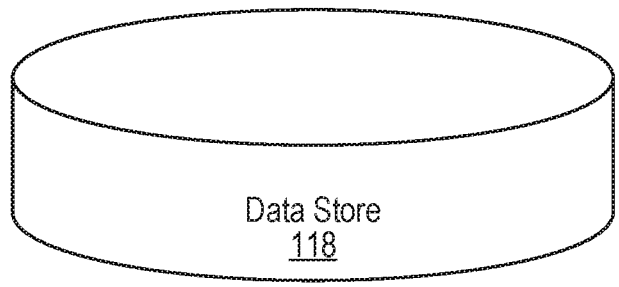

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Optimal Access to Content Items in News Feed

A news feed can be an effective technique to present content items (or stories) to a user. In some instances, a news feed can constitute an ordered listing of content items presented for the user to stay apprised of events in his or her social network. The news feed for the user can include various types of content items. The content items can include, for example, images uploaded by others in a social network of the user, accounts of activities of connections of the user, articles regarding subject matter of interest to the user, advertisements directed to the user, etc. The news feed can be managed by a server system associated with a social network. A client computing device in communication with the server system can download content items to be presented in the news feed. User experience in accessing and consuming content items in the news feed can depend on the communications link quality between the client computing device and the server system.

Conventional techniques arising in computer technology to present content items in a news feed can be disadvantageous. When the communications link quality between the server system and the client computing device is poor, content items to be downloaded from the server system to the client computing device can entail significant delay. Such delay can result in undesirable user experience as users wait undue amounts of time to see desired content. In some instances, the content items may not be downloaded at all if the communication link is especially problematic.

An improved approach rooted in computer technology to allow management of content items in a news feed by a client computing device associated with a user overcomes these and other disadvantages associated with conventional approaches implemented in computer technology. Systems, methods, and computer readable media of the present technology can receive content items for presentation in a news feed operated by a social networking system. Content items can include text, images, video, audio, or any combination thereof. The content items can be selected for presentation in the news feed based on a news feed algorithm that determines the most relevant content for the user. The content items, in response to a query for content items from a client computing device to a server system operated by the social networking system, can be downloaded to the client computing device when a communications link quality between the server system and the client computing device can satisfy a communications bandwidth threshold. Although the content items may be downloaded for presentation in the news feed, some content items may not be viewed or otherwise consumed by the user. Content items not consumed by the user can be cached in the client computing device. When a subsequent query is provided from the client computing device to the server system for content items to be presented in the news feed, the communications link quality can fail to satisfy the communications bandwidth threshold. When the bandwidth threshold is not satisfied, a query to the cache on the client computing device instead of the server system can be performed to obtain content items for presentation in the news feed. Content items previously cached can be sorted and ranked before presentation. More details regarding the present technology are discussed herein.

Figure 6:
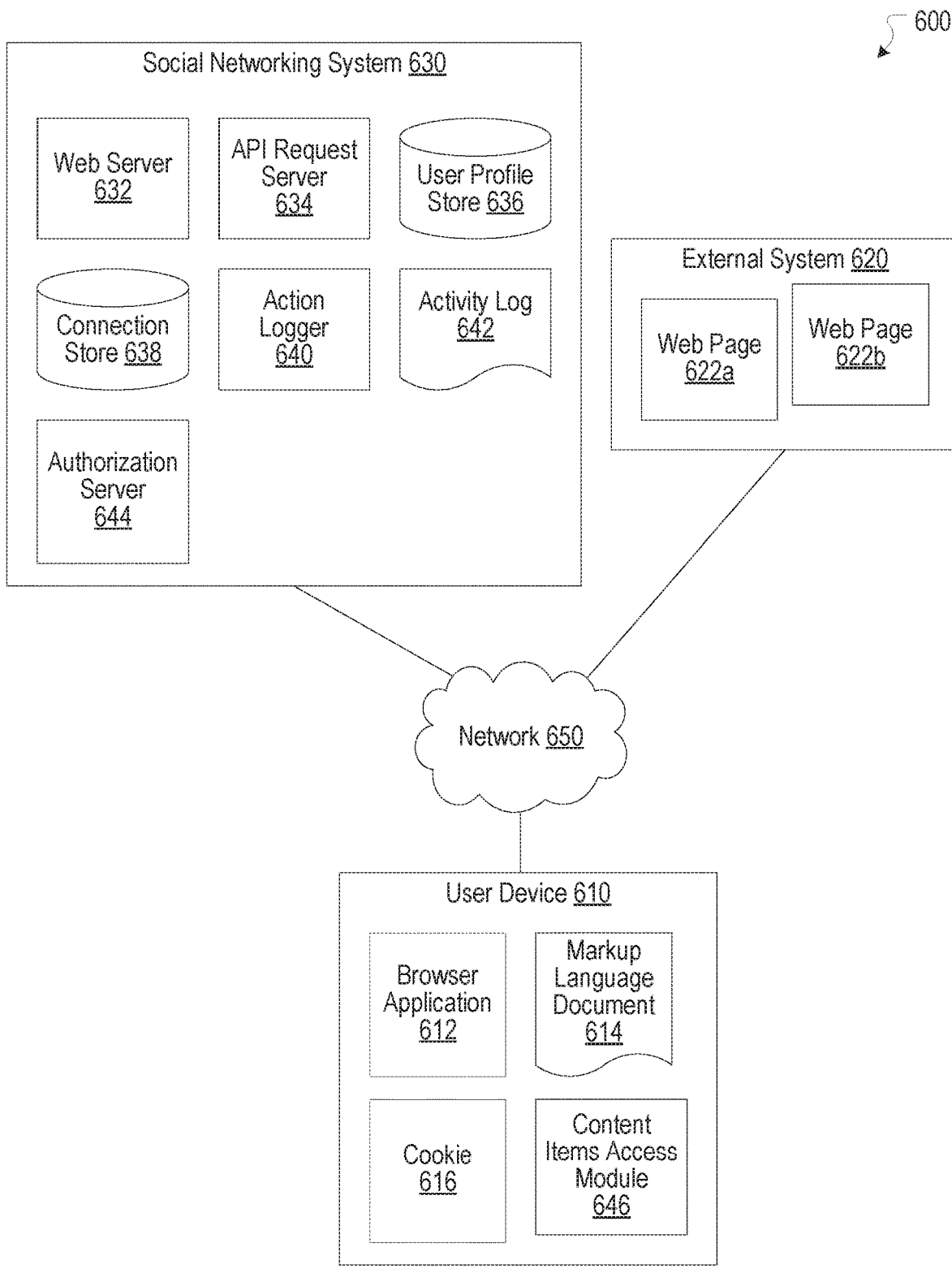
FIG. 6 illustrates a network diagram of an example system that can be utilized in various scenarios, according to an embodiment of the present technology.

FIG. 1 illustrates an example system 100 including an example content items access module 102 configured to allow optimized access to content items for presentation in a news feed supported by a social networking system, according to an embodiment of the present technology. The content items access module 102 can obtain content items for presentation in a news feed from a server system or a client computing device based on a communications quality link. In some embodiments, the content items access module 102 can be implemented as or in an application supported by the social networking system and running on a client computing device, such as a user device 610 as shown in FIG. 6 as discussed in more detail herein.

The content items access module 102 can include a news feed interface module 104 and a bumping module 106. The components (e.g., modules, elements, steps, blocks, etc.) shown in this figure and all figures herein are exemplary only, and other implementations may include additional, fewer, integrated, or different components. Some components may not be shown so as not to obscure relevant details.

In various embodiments, one or more of the functionalities described in connection with the content items access module 102 can be implemented in any suitable combinations.

The news feed interface module 104 can communicate with a news feed algorithm that determines relevant content items for presentation in news feeds of users of a social networking system. In response to a query for content items to be presented in the news feed, such as a query generated in response to a pull to refresh action by a user, the news feed interface module 104 can communicate with a server system that implements the news feed algorithm to obtain the content items. In one implementation, the news feed algorithm can train (and retrain) machine learning models for ranking content items for potential presentation in news feeds of users. For example, the news feed algorithm can divide its users into different sets based on various attributes of the users (e.g., age, ethnicity, income, language, etc.) and can generate one or more models for each set of users. Users with different attributes may have different behavioral patterns that can reflect their interests in different topics reflected by content items. As a result, different models for ranking content items for different sets of users can provide more accurate ranking of content items and provide higher likelihood that users will be interested in the topics reflected by the content items presented to them.

In accordance with the news feed algorithm, features used to train the models can include interactions of users with content items of a news feed. Such interactions can include, for example, selecting a link in the content item, commenting on the content item, liking the content item, and hiding the content item. The news feed algorithm can use the models for each set of users to determine levels of interest of a user in topics reflected by content items. The level of interest of a user in each topic can be indicated by a topic score. The social networking system can rank a content item for potential presentation to a user based on a topic(s) reflected by the content item and the topic score(s) of the user for the topic(s). In some instances, an aggregate score can be determined for the user in connection with each content item overall, and the content items can be ranked based on their aggregate scores. Content items having a ranking that satisfies a selected threshold value can be ultimately provided to the news feed interface module 104.

The bumping module 106 can create queries for content items, such as queries generated in response to pull to refresh actions performed by a user on a client computing device, to be obtained from a server system. The content items downloaded to the client computing system but not consumed by the user are maintained in a cache. When the communications link quality between the client computing device and the server system does not satisfy a threshold communications bandwidth value in relation to a subsequent query, content items maintained in the cache can be identified for potential presentation in the news feed in response to the subsequent query. The identified content items can be sorted and ranked before presentation in the news feed. The bumping module 106 is discussed in more detail herein.

In some embodiments, the content items access module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content items access module 102 can be, in part or in whole, implemented as software running on one or more computing devices or systems, such as on a client computing device or a server. For example, the content items access module 102 can be implemented as or within a dedicated application (e.g., app), a program, or an applet running on a user computing device or client computing system. In some instances, the content items access module 102 can be, in part or in whole, implemented within or configured to operate in conjunction or be integrated with a social networking system (or service), such as a social networking system 630 of FIG. 6. Likewise, in some instances, the content items access module 102 can be, in part or in whole, implemented within or configured to operate in conjunction or be integrated with client computing device, such as the user device 610 of FIG. 6. It should be understood that many variations are possible.

The data store 118 can be configured to store and maintain various types of data, such as the data relating to support of and operation of the content items access module 102. The data maintained by the data store 118 can include, for example, communications link quality data, communications bandwidth thresholds, content items that have not been consumed, content items that have been consumed, etc. The data store 118 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the content items access module 102 can be configured to communicate and/or operate with the data store 118. In some embodiments, the data store 118 can be a cache within a client computing device. In some embodiments, the data store 118 can be a data store of a server system in communication with the client computing device.

Figure 2:
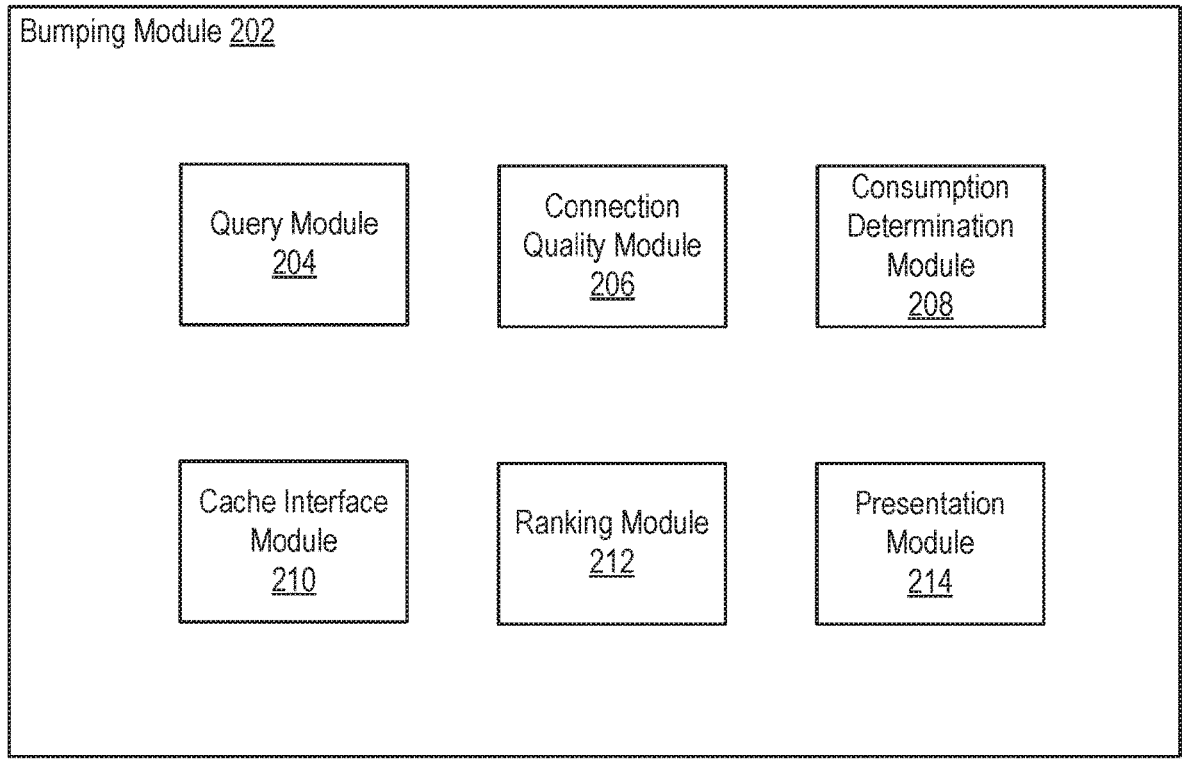
FIG. 2 illustrates an example bumping module, according to an embodiment of the present technology.

FIG. 2 illustrates an example bumping module 202, according to an embodiment of the present technology. In some embodiments, the bumping module 106 of FIG. 1 can be implemented with the bumping module 202. As shown in the example of FIG. 2, the bumping module 202 can include a query module 204, a connection quality module 206, a consumption determination module 208, a cache interface module 210, a ranking module 212, and a presentation module 214.

The query module 204 can provide a query for content items to present in the news feed in response to a request for the content items. In an embodiment, a request for content items can be an indication by the user that the user wishes to consume more content items. For example, a request can include a pull to refresh action or other selection performed by a user to allow the user to consume content items in addition to content items that may have been previously presented in the news feed.

A query provided by the query module 204 can include a query from a client computing device to a server system for the content items. In some embodiments, the server system can be a server system operated or controlled by a social networking system. The query to the server system can occur when it is determined that a communications link quality satisfies a communications bandwidth threshold. The communications bandwidth threshold can reflect a minimum communications bandwidth value that allows content items to be downloaded from the server system so that latency on the client computing device in relation to acquiring the content items and presenting the content items in the news feed is within an acceptable range. The communications bandwidth threshold can vary or be adjusted based on a variety of environmental factors, such as a region (e.g., country) in which the client computing device or server system is located or a processing speed of the client computing device among other factors. In some embodiments, the communications bandwidth threshold can be a selected communications bandwidth value.

A query provided by the query module 204 can include a query from a client computing device to a cache of the client computing device when the communications quality link does not satisfy the communications bandwidth threshold. The cache can contain content items that have been previously downloaded from the server system but that have not been consumed by the user. The cached content items can be presented in the news feed without querying the server system for content items. In this manner, undesired latency associated with downloading content items from the server system when the communications link quality does not satisfy the communications bandwidth threshold can be avoided.

The connection quality module 206 can determine the communications link quality between the server system and the client computing device at or near a time when a query for content items is provided. The determination of the communications link quality can inform whether a query for content items to be presented in the news feed should be provided from the client computing device to the server system or to a cache of the client computing device. In some embodiments, the connection quality module 206 can determine the communications link quality as a communications bandwidth value. The communications link quality can be determined in a variety of manners. For example, the connection quality module 206 can determine the communications link quality based on the data throughput measured on the client computing device. As another example, the communications link quality can be measured by the server system and provided to the connection quality module 206.

The connection quality module 206 can determine whether the communications link quality at or near a time when a query for content items is provided satisfies the communications bandwidth threshold. If the communications link quality satisfies the communications bandwidth threshold, the query can be provided from the client computing device to the server system. If the communications link quality does not satisfy the communications bandwidth threshold, the query can be provided from the client computing device to the cache of the client computing device.

The consumption determination module 208 can determine when a content item presented to a user in the news feed has been consumed by the user based on a consumption threshold. The downloading or presentation of content items on the client computing device does not necessarily indicate that the content items have been consumed. For example, a content item may be fleetingly presented in the news feed if a user quickly scrolls past the content item to consume another content item. In these types of circumstances, the content item, while perhaps instantaneously presented to and viewed by the user in the news feed, is not actually consumed by the user because it can be inferred, for example, that the user did not bring his or her exclusive or dedicated attention to the content item. The consumption determination module 208 can detect viewing and interactions by the user in connection with content items of a news feed displayed on a screen of the client computing device.

A consumption threshold can be defined or selected to signify consumption of a content item by the user. In some embodiments, the consumption threshold can be a predetermined amount of time that the content item is presented in the screen of the client computing device. The predetermined amount of time can reflect a selected confidence level that the user has actually consumed the content item. For example, the consumption threshold can be a value of one second. In other examples, any other suitable value of time can be selected as the consumption threshold. In some embodiments, the consumption threshold can be a predetermined interaction by the user relating to or with the content item. For example, the consumption threshold can be a selection of the content item (e.g., a click to see expanded content associated with the content item), selection of a like button associated with the content item, a selection of a comment button to comment on the content item, a selection of a share button to share the content item with others, etc. The consumption threshold can be determined by an administrator of a social networking system.

The consumption determination module 208 can apply the consumption threshold to determine if a content item presented in the news feed has been consumed by the user. If the consumption threshold has been satisfied with respect to a content item, the consumption determination module 208 can determine that the content item has been consumed by the user. If the consumption threshold has not been satisfied with respect to a content item, the consumption determination module 208 can determine that the content item has not been consumed by the user. Content items that have not been consumed by the user can be stored in the cache of the client computing device.

The cache interface module 210 can allow the bumping module 202 to communicate with a cache on the client computing device. The cache interface module 210 can provide content items that have not been consumed to the cache. A content item can be stored in the cache along with metadata. The metadata can include a score associated with the content item used to rank the content item in a news feed, and a date and time that the content item was provided by the server system. The cache interface module 210 also can provide queries generated by the query module 204 to the cache when the communications link quality does not satisfy the communications bandwidth threshold. The cache interface module 210 can receive from the cache content items that have not been consumed by the user in response to queries provided to the cache.

The ranking module 212 can sort and rank content items that have been provided by the cache for presentation in the news feed. A variety of techniques can be applied to sort and rank the content items. In one embodiment, the content items provided by the cache can be sorted based on their associated scores. A selected number of the content items with the highest scores can be presented in the news feed.

In another embodiment, the content items provided by the cache can be sorted based on their associated scores and on a time decay factor applied to the associated scores. The time decay factor can be linear or nonlinear. Although a content item may have a higher score, if the content item is older in time, then the content item may be assigned a lower score. For example, assume a score of a first content item from the cache is higher than a score of a second content item from the cache. In this example, assume further that the first content item was provided from the server system at a time earlier than a time when the second content item was provided from the server system. The earlier time associated with the first content item may result in a reduction in the score of the first content item so that the score of the first content item becomes lower than the score of the second content item. A selected number of the content items with the highest scores can be presented in the news feed.

The presentation module 214 can cause the content items provided from the cache and ranked according to their scores to be presented in the news feed. The content items can be presented in the news feed when a request for content items is made by the user and when the communications link quality does not satisfy a communications bandwidth threshold. The presentation module 214 can present the content items according to their ranking. For example, the content items having relatively higher scores can be shown at relatively higher positions in the news feed.

Figure 3:
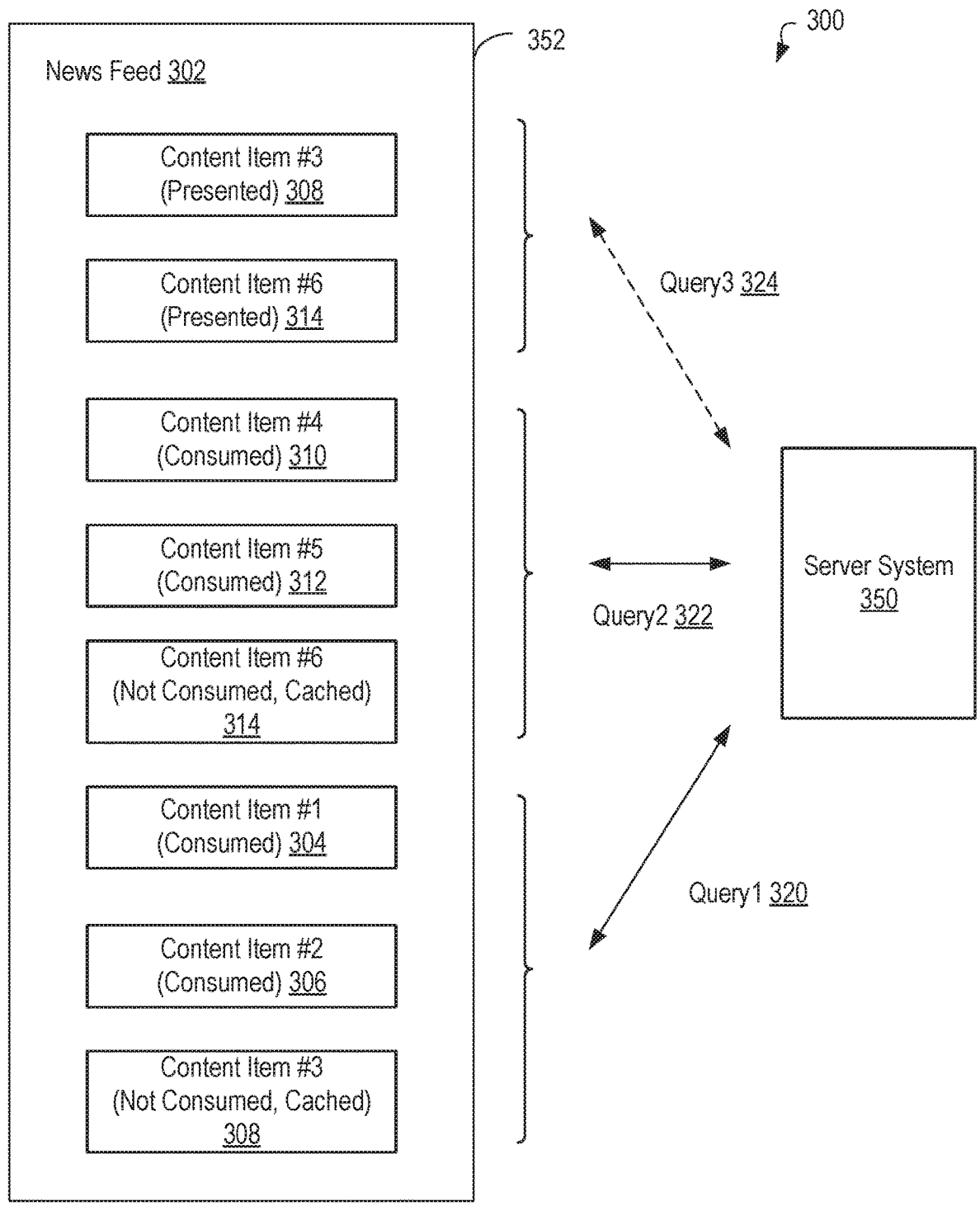
FIG. 3 illustrates a first example scenario for presenting content items in a news feed, according to an embodiment of the present technology.

FIG. 3 illustrates an example scenario 300 for presenting content items in a news feed 302 displayed on a screen of a client computing device 352 of a user, according to an embodiment of the present technology. A first request for content items causes a query1 320 to be provided from the client computing device 352 to a server system 350. In connection with the communication of the query1 320, the communications link quality satisfies the communications bandwidth threshold. As a result, content item #1 304, content item #2 306, and content item #3 308 are provided from the server system to the client computing device 352 in response to the query1 320. It is determined that the user has consumed content item #1 304 and content item #2 306 because a consumption threshold with respect to these content items has been satisfied. For example, it can be determined that the user viewed content item #1 304 and content item #2 306 for a selected amount of time. However, it is determined that content item #3 308 was not consumed by the user because the consumption threshold with respect to this content item has not been satisfied. Accordingly, content item #3 308 is provided to a cache on the client computing device 352.

A second request for content items causes a query2 322 to be provided from the client computing device 352 to the server system 350. In connection with the communication of the query2 322, the communications link quality satisfies the communications bandwidth threshold. As a result, content item #4 310, content item #5 312, and content item #6 314 are provided from the server system to the client computing device 352 in response to the query2 322. It is determined that the user has consumed content item #4 310 and content item #5 312 because a consumption threshold with respect to these content items has been satisfied. However, it is determined that content item #6 314 was not consumed by the user because the consumption threshold with respect to this content item has not been satisfied. Accordingly, content item #6 314 is provided to the cache on the client computing device 352.

A third request for content items causes a query3 324 to be provided from the client computing device 352 to the server system 350. In connection with the communication of the query3 324, the communications link quality does not satisfy the communications bandwidth threshold. Instead, the query3 324 is provided to the cache on the client computing device 352. The cache contains content item #3 308 and content item #6 314, which were previously not consumed by the user and therefore cached. Accordingly, content item #3 308 and content item #6 314 are returned from the cache for presentation in the news feed in response to the query3 324. The order of presentation of content item #3 308 and content item #6 can be based on sorting and ranking content item #3 308 and content item #6 314, as discussed in more detail herein.

Figure 4:
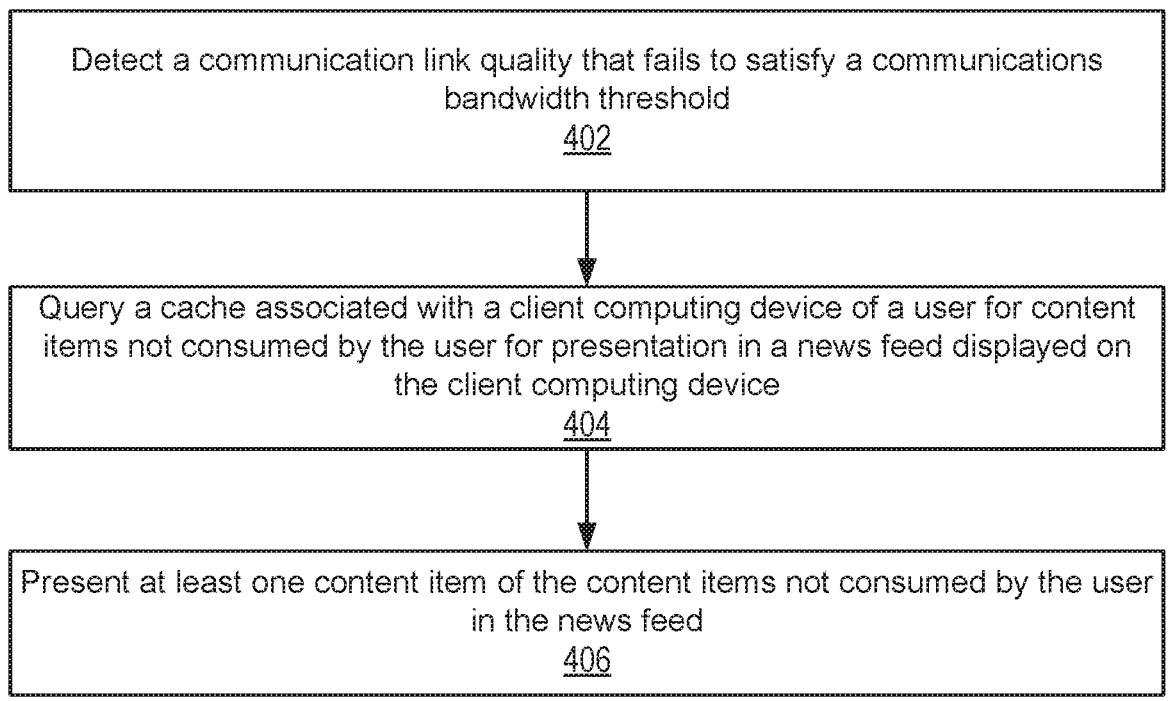
FIG. 4 illustrates a first method, according to an embodiment of the present technology.

FIG. 4 illustrates a first example method 400 for presenting content items in a news feed, according to an embodiment of the present technology. It should be appreciated that there can be additional, fewer, or alternative steps performed in similar or alternative orders, or in parallel, in accordance with the various embodiments and features discussed herein unless otherwise stated.

At block 402, the method 400 can detect a communication link quality that fails to satisfy a communications bandwidth threshold. At block 404, the method 400 can query a cache associated with a client computing device of a user for content items not consumed by the user for presentation in a news feed displayed on the client computing device. At block 406, the method 400 can present at least one content item of the content items not consumed by the user in the news feed. Other suitable techniques that incorporate various features and embodiments of the present technology are possible.

Figure 5:
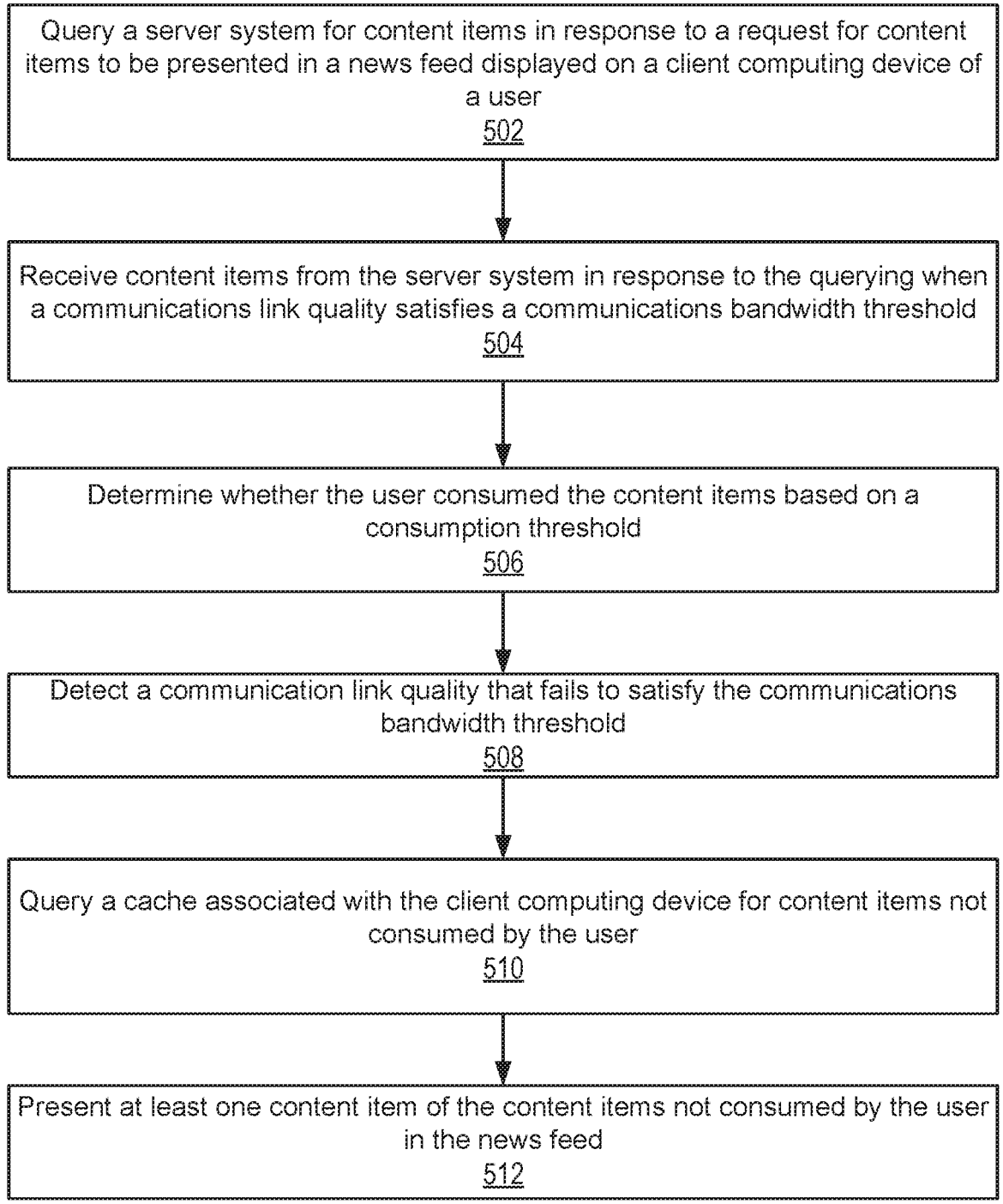
FIG. 5 illustrates a second method, according to an embodiment of the present technology.

FIG. 5 illustrates a second example method 500 for presenting content items in a news feed, according to an embodiment of the present technology. It should be appreciated that there can be additional, fewer, or alternative steps performed in similar or alternative orders, or in parallel, in accordance with the various embodiments and features discussed herein unless otherwise stated.

At block 502, the method 500 can query a server system for content items in response to a request for content items to be presented in a news feed displayed on a client computing device of a user. At block 504, the method 500 can receive content items from the server system in response to the querying when a communications link quality satisfies a communications bandwidth threshold. At block 506, the method 500 can determine whether the user consumed the content items based on a consumption threshold. At block 508, the method 500 can detect a communication link quality that fails to satisfy the communications bandwidth threshold. At block 510, the method 500 can query a cache associated with the client computing device for content items not consumed by the user. At block 512, the method 500 can present at least one content item of the content items not consumed by the user in the news feed. Other suitable techniques that incorporate various features and embodiments of the present technology are possible.

Social Networking System—Example Implementation

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 can include a content items access module 646. The content items access module 646 can be implemented with the content items access module 102, as discussed in more detail herein. In some embodiments, one or more functionalities of the content items access module 646 can be implemented in the social networking system 630.

Hardware Implementation

Figure 7:
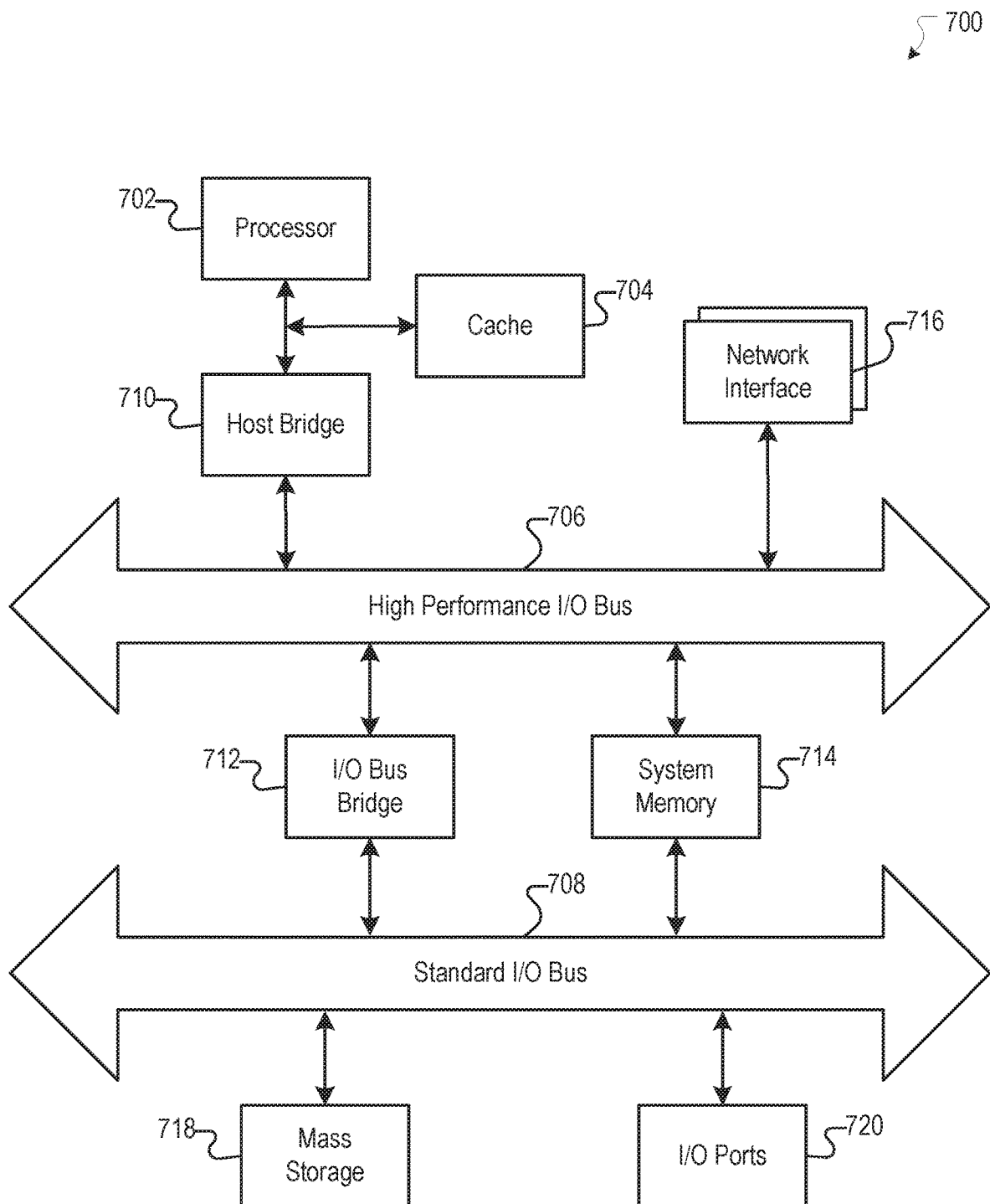
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, whether a content item is consumed by a user based on a consumption threshold relating to a predetermined amount of time that the content item is presented in a screen of a client computing device of the user;
   in response to failure of content items to satisfy the consumption threshold, storing, by the computing system, in a cache associated with the client computing device the content items and associated metadata, wherein the content items are determined to be content items not consumed by the user and the metadata includes scores associated with the content items used to rank the content items in a news feed;
   detecting, by the computing system, a communications link quality that fails to satisfy a communications bandwidth threshold, wherein the communications bandwidth threshold is variable based on at least one of a region of the client computing device or a processing speed of the client computing device;
   in response to the detecting, querying, by the computing system, the cache associated with the client computing device of the user for the content items not consumed by the user for presentation in the news feed displayed on the client computing device; and
   presenting, by the computing system, at least one content item of the content items not consumed by the user in the news feed.

2. The computer-implemented method of claim 1, further comprising:
   querying a server system for content items in response to a request for content items to be presented in the news feed; and
   receiving content items from the server system in response to the querying when the communications link quality satisfies the communications bandwidth threshold.

3. The computer-implemented method of claim 2, wherein the request is a pull to refresh action performed by the user.

4. The computer-implemented method of claim 3, wherein the consumption threshold further relates to a selected interaction with a content item.

5. The computer-implemented method of claim 2, wherein the querying the cache comprises:
   querying the cache for content items in response to a request for content items to be presented in the news feed in response to the communications link quality failing to satisfy the communications bandwidth threshold.

6. The computer-implemented method of claim 5, further comprising:
   not querying the server system when the communications link quality fails to satisfy the communications bandwidth threshold.

7. The computer-implemented method of claim 1, further comprising:
   sorting the content items not consumed by the user based on the metadata stored in the cache; and
   ranking the content items not consumed by the user.

8. The computer-implemented method of claim 7, wherein the sorting and the ranking are performed by the client computing device.

9. The computer-implemented method of claim 7, wherein the metadata further includes dates and times associated with the content items.

10. The computer-implemented method of claim 9, wherein the sorting is based on the scores associated with the content items and a time decay factor applied to the scores.

11. The computer-implemented method of claim 1, wherein the client computing device includes the computing system.

12. The computer-implemented method of claim 1, wherein the consumption threshold further relates to at least one of selection of the content item to view expanded content associated with the content item, selection of a like button associated with the content item, a selection of a comment button to comment on the content item, or a selection of a share button to share the content item with others.

13. A system comprising:
    at least one processor; and
    a memory storing instructions that, when executed by the at least one processor, cause the system to perform:
    determining whether a content item is consumed by a user based on a consumption threshold relating to a predetermined amount of time that the content item is presented in a screen of a client computing device of the user;
    in response to failure of content items to satisfy the consumption threshold, storing in a cache associated with the client computing device the content items and associated metadata, wherein the content items are determined to be content items not consumed by the user and the metadata includes scores associated with the content items used to rank the content items in a news feed;

detecting a communications link quality that fails to satisfy a communications bandwidth threshold, wherein the communications bandwidth threshold is variable based on at least one of a region of the client computing device or a processing speed of the client computing device;

in response to the detecting, querying the cache associated with the client computing device of the user for the content items not consumed by the user for presentation in the news feed displayed on the client computing device; and presenting at least one content item of the content items not consumed by the user in the news feed.

14. The system of claim 13, further comprising:

querying a server system for content items in response to a request for content items to be presented in the news feed; and receiving content items from the server system in response to the querying when the communications link quality satisfies the communications bandwidth threshold.

15. The system of claim 14, wherein the request is a pull to refresh action performed by the user.

16. The system of claim 15, wherein the consumption threshold further relates to a selected interaction with a content item.

17. A non-transitory computer-readable storage medium including instructions that, when executed by at least one processor of a computing system, cause the computing system to perform a method comprising:

determining whether a content item is consumed by a user based on a consumption threshold relating to a predetermined amount of time that the content item is presented in a screen of a client computing device of the user;

in response to failure of content items to satisfy the consumption threshold, storing in a cache associated with the client computing device the content items and associated metadata, wherein the content items are determined to be content items not consumed by the user and the metadata includes scores associated with the content items used to rank the content items in a news feed;

detecting a communications link quality that fails to satisfy a communications bandwidth threshold, wherein the communications bandwidth threshold is variable based on at least one of a region of the client computing device or a processing speed of the client computing device;

in response to the detecting, querying the cache associated with the client computing device of the user for the content items not consumed by the user for presentation in the news feed displayed on the client computing device; and presenting at least one content item of the content items not consumed by the user in the news feed.

18. The non-transitory computer-readable storage medium of claim 17, further comprising:

querying a server system for content items in response to a request for content items to be presented in the news feed; and receiving content items from the server system in response to the querying when the communications link quality satisfies the communications bandwidth threshold.

19. The non-transitory computer-readable storage medium of claim 18, wherein the request is a pull to refresh action performed by the user.

20. The non-transitory computer-readable storage medium of claim 19, wherein the consumption threshold further relates to a selected interaction with a content item.

* * * * *